UNITED STATES PATENT OFFICE.

FRANZ SCHMIDT, OF HAMBURG, GERMANY.

PROCESS OF TREATING COFFEE-BEANS FOR THE ELIMINATION OF DELETERIOUS CONSTITUENTS THEREOF.

1,069,982.  Specification of Letters Patent.  Patented Aug. 12, 1913.

No Drawing.  Application filed November 28, 1912. Serial No. 733,069.

*To all whom it may concern:*

Be it known that I, FRANZ SCHMIDT, professor, a citizen of the German Empire, residing at Hamburg, Germany, have invented certain new and useful Improvements in Processes of Treating Coffee-Beans for the Elimination of Deleterious Constituents Thereof, of which the following is a specification.

According to the latest observations and experience the principal cause of unhygienic qualities in coffee is the presence of oil-acid products due to the dry distillation of the raw bean, produced during the roasting process.

An efficient process of eliminating the poisonous constituents of coffee must accordingly provide for preventing, as far as may be, the occurrence of these oil-acid distillation products during the roasting, and for eliminating such products when formed, or possibly for converting them to a form in which they are not injurious to health. According to the present invention this is effected by eliminating from the coffee, as far as may be, those substances which assist in the formation of the undesirable products referred to, that is to say, such substances as tannic acid, substances having affinity thereto, derivatives thereof, fats, and resinous matter which is affected by the roasting process and enters into reaction.

The process is designed to absorb and extract the substances in question by absorbent action, an operation which is greatly assisted by loosening the husk layers of the coffee. The process is, accordingly, mainly a physical process.

It is of quite secondary importance in what manner the loosening of the husk layers is effected, whether, for example, by soaking in cold or warm water, or by natural moisture in the coffee, or by steam, possibly with the aid of soda for increasing the solubility of the tannic and gallic acid, or by cooled salt water for reducing the solubility of some extractible constituents of the coffee. It is, accordingly, also a secondary feature that external impurities due to the manner of gathering the coffee are also removed by the process.

The essential feature is the suctional principle of the process, which may be likened to a vacuum cleansing of the coffee in accordance with the physical laws of capillarity, differentiated from mere exhaustion of air from the container of the coffee, though such exhaustion of air, as an auxiliary measure, is not precluded.

Briefly set forth, the process is as follows. The coffee beans, raw, partly roasted or wholly roasted, are surrounded, hot or cold, with or without preliminary softening (as for example by steaming), with substances such as argillaceous earth, china clay and the like, in the form of paste or powder, and are preferably dried, such substances being adapted to produce an absorbent effect. The softening of the beans in only effected in cases where the beans are not possessed of sufficient natural moisture to enable practice of the process. The paste which has dried on, or which falls off after the drying, is then removed by any suitable process. If the purified coffee was not previously roasted, or only partly roasted, the roasting is then performed or completed.

The manner of preventing the formation of poisonous substances, and of removing such substances, having been described, there remains to describe the manner of rendering poisonous substances innocuous. This can with advantage be effected by adding to the absorbent material a neutralizing agent, f. i. an agent which binds the acids such as magnesia for the purpose to prevent the return thereof to the coffee.

What I claim is:—

1. The herein described process of treating coffee beans which consists in subjecting the beans to the action of an absorbent agent and then in removing said agent from the beans.

2. The herein described process of treating coffee beans which consists in first softening the beans, then in subjecting the beans to the action of an absorbent substance and finally in removing the absorbent substance from the beans.

3. The herein described process of treating coffee beans which consists in applying an absorbent substance to the beans and then in removing the substance from the beans.

4. The herein described process of treating coffee beans which consists in applying an absorbent substance to the beans to which substance is added a neutralizing agent, and finally in removing the substance and agent from the beans.

5. The herein described process of treating coffee beans which consists in applying an absorbent substance to the beans to which substance an acid neutralizing agent, such as magnesia is added, and finally in removing the substance and agent from the beans.

In testimony whereof I hereunto affix my signature in the presence of two witnesses.

FRZ. SCHMIDT.

Witnesses:
    AUG. HAMAEN,
    HERM. PAULES.